(12) United States Patent
Jeong (10) Patent No.: US 10,264,520 B2
(45) Date of Patent: Apr. 16, 2019

(54) METHOD OF SUPPORTING MOBILITY OF UE SUPPORTING/USING D2D COMMUNICATION IN WIRELESS MOBILE COMMUNICATION SYSTEM

(71) Applicant: Samsung Electronics Co., Ltd, Gyeonggi-do (KR)

(72) Inventor: Kyeongin Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/905,753

(22) PCT Filed: Jul. 21, 2014

(86) PCT No.: PCT/KR2014/006614
§ 371 (c)(1),
(2) Date: Jan. 15, 2016

(87) PCT Pub. No.: WO2015/009131
PCT Pub. Date: Jan. 22, 2015

(65) Prior Publication Data
US 2016/0157172 A1 Jun. 2, 2016

(30) Foreign Application Priority Data

Jul. 19, 2013 (KR) .......................... 10-2013-0085459

(51) Int. Cl.
*H04B 7/00* (2006.01)
*H04W 48/20* (2009.01)
(Continued)

(52) U.S. Cl.
CPC ....... *H04W 48/20* (2013.01); *H04W 36/0083* (2013.01); *H04W 76/14* (2018.02);
(Continued)

(58) Field of Classification Search
CPC ......... H04W 36/0005; H04W 36/0055; H04W 36/16; H04W 36/22; H04W 36/24
(Continued)

(56) References Cited

U.S. PATENT DOCUMENTS

| 4,703,959 A | 11/1987 | Reaves et al. |
| 4,969,671 A | 11/1990 | Gross et al. |

(Continued)

FOREIGN PATENT DOCUMENTS

| CN | 102783211 A | 11/2012 |
| CN | 102790993 A | 11/2012 |

(Continued)

OTHER PUBLICATIONS

MAC protocol specification (Release 8), 3GPP, TS 36.321, 2008, pp. 1-33.*

(Continued)

*Primary Examiner* — Dmitry Levitan (57) ABSTRACT

Disclosed is a method of supporting/using Device-to-Device (D2D) communication supporting user equipment (UE) mobility in a wireless mobile communication system. A method and an apparatus for performing D2D communication includes receiving system information of at least one of a serving cell and an adjacent cell of the UE. The method and apparatus for performing D2D communication also includes determining whether cell redirection is required to perform the direct communication based on the system information. The method and apparatus for performing D2D communication further includes performing the cell redirection on the adjacent cell when the cell redirection is required according to a result of the determination.

20 Claims, 7 Drawing Sheets

(51) Int. Cl.
*H04W 36/00* (2009.01)
*H04W 76/14* (2018.01)
*H04W 48/12* (2009.01)
*H04W 4/70* (2018.01)

(52) U.S. Cl.
CPC .......... *H04W 4/70* (2018.02); *H04W 36/0061* (2013.01); *H04W 48/12* (2013.01)

(58) Field of Classification Search
USPC ................ 370/310, 328, 331, 349, 431, 432
See application file for complete search history.

(56) References Cited

U.S. PATENT DOCUMENTS

| | | | | |
|---|---|---|---|---|
| 8,577,363 | B2* | 11/2013 | Wijting | H04W 76/023 455/426.1 |
| 9,319,955 | B2* | 4/2016 | Kim | H04W 36/22 |
| 9,320,067 | B2* | 4/2016 | Ho | H04B 7/022 |
| 9,414,268 | B2* | 8/2016 | Fodor | H04W 36/08 |
| 9,479,957 | B2* | 10/2016 | Lee | H04W 24/10 |
| 9,622,131 | B2 | 4/2017 | Koskela et al. | |
| 9,699,710 | B2* | 7/2017 | Lee | H04W 48/12 |
| 2012/0163235 | A1 | 6/2012 | Ho et al. | |
| 2013/0084914 | A1 | 4/2013 | Wu et al. | |
| 2013/0157676 | A1 | 6/2013 | Baek et al. | |
| 2013/0322413 | A1* | 12/2013 | Pelletier | H04W 72/1289 370/336 |
| 2014/0127991 | A1 | 5/2014 | Lim et al. | |
| 2014/0323126 | A1 | 10/2014 | Ro et al. | |
| 2015/0146687 | A1* | 5/2015 | Kim | H04W 76/023 370/331 |
| 2015/0271859 | A1* | 9/2015 | Huang | H04W 72/12 370/329 |
| 2015/0312836 | A1* | 10/2015 | Fukuta | H04W 36/08 455/438 |
| 2015/0341970 | A1* | 11/2015 | Fukuta | H04W 48/08 370/254 |

FOREIGN PATENT DOCUMENTS

| | | |
|---|---|---|
| KR | 10-2014-0103049 | 8/2014 |
| KR | 10-2014-0128059 | 11/2014 |
| WO | 2012/088470 A1 | 6/2012 |
| WO | 2012144941 A1 | 10/2012 |
| WO | 2012177002 A2 | 12/2012 |
| WO | 2013055271 A1 | 4/2013 |

OTHER PUBLICATIONS

International Search Report dated Sep. 29, 2014 in connection with International Patent Application No. PCT/KR2014/006614, 3 pages.
Written Opinion of the International Searching Authority dated Sep. 29, 2014 in connection with International Application No. PCT/KR2014/006614, 6 pages.
"3rd Generation Partnership Project; Technical Specification Group Radio Access Network; Evolved Universal Terrestrial Radio Access (E-UTRA); Medium Access Control (MAC) Protocol Specification (Release 10)," 3GPP TS 36.321, V10.9.0, Jun. 2013, 54 pages.
Foreign Communication From a Related Counterpart Application, European Application No. 14826671.1-1854, Extended European Search Report dated Jan. 23, 2017, 10 pages.
European Patent Office, "Communication pursuant to Article 94(3) EPC," Application No. EP 14826671.1, dated Sep. 12, 2017, 7 pages.
Office Action dated May 18, 2018 in connection with Chinese Patent Application No. 201480040844.7.

* cited by examiner

METHOD OF SUPPORTING MOBILITY OF UE SUPPORTING/USING D2D COMMUNICATION IN WIRELESS MOBILE COMMUNICATION SYSTEM

TECHNICAL FIELD

The present disclosure relates generally to a method of supporting mobility of a UE supporting Device to Device (D2D) communication in a wireless mobile communication system and a UE thereof.

BACKGROUND ART

In general, mobile communication systems have been developed for the purpose of providing communication while securing user mobility. The mobile communication systems have reached a stage where a high speed data communication service can be provided as well as voice communication on the strength of the rapid development of technology. Currently, a standardization operation from a 3rd Generation Partnership Project (3GPP) system to a Long Term Evolution (LTE)/LTE-Advanced (LTE-A) system is being progressed as one of the next generation mobile communication systems. LTE is a technology which implements high speed packet-based communication having a transmission rate of 100 Mbps. As types of services using wireless mobile communication systems significantly diversify, a demand for a new technology for more efficiently supporting newly appearing services increases, and accordingly, new methods and technologies are being researched for the LTE/LTE-A systems.

Device to Device (D2D) communication is a technology recently researched and enables a User Equipment (UE) to basically perform direct communication with another UE located adjacently to the UE.

Through the D2D communication technology, the UE may perform discovery (hereinafter, referred to as "D2D-D") in which the UE looks for UEs located adjacently to the UE itself and can perform direct communication (hereinafter, referred to as "D2D-C") with a UE requiring communication. Through the use of the D2D communication, it is possible to efficiently use radio resources in comparison with communication through a base station using the conventional wireless network. Further, through the use of the D2D communication, the UE can directly provide information to a UE which needs the information by using a method of discovering neighboring UEs, so that Social Networking Services (SNS) and advertisement services can be more efficiently supported.

DISCLOSURE OF INVENTION

Technical Problem

The present disclosure provides a method of supporting mobility of a UE supporting D2D communication in a wireless mobile communication system.

Solution to Problem

To address the above-discussed deficiencies, it is a primary object to provide a method of supporting mobility of a user equipment (UE) supporting device-to-device (D2D) communication in a wireless mobile communication system.

In a first example, a communication method of a user equipment (UE) is provided. The method includes triggering a direct communication. The method also includes transmitting an access request message comprising information indicating that the access request message is for the direct communication to an Evolved Node B (ENB). The method further includes performing the direct communication according to resource information received from the base station.

In a second example, a communication method of an Evolved Node B (ENB) is provided. The method includes receiving an access request message from a user equipment (UE). The method also includes identifying that the access request message comprises information indicating that the access request message is for the direct communication. The method further includes transmitting, if the access request message comprises information indicating that the access request message is for the direct communication, resource information for the direct communication of the UE.

In a fourth example, a user equipment (UE) is provided. The UE includes a transceiver configured to transmit and receive data. The UE also includes a controller configured to control to trigger a direct communication, to transmit an access request message comprising information indicating that the access request message is for the direct communication to an Evolved Node B, and perform the direct communication according to resource information received from the ENB.

In a fifth example, an evolved Node B (ENB) is provided. The ENB includes a transceiver configured to transmit and receive data. The ENB also includes a controller configured to control to receive an access request message from a User Equipment (UE), to identify that the access request message comprises information indicating that the access request message is for the direct communication, and to transmit, if the access request message comprises information indicating that the access request message is for the direct communication, resource information for the direct communication of the UE.

Advantageous Effects of Invention

According to the present disclosure, a method of supporting mobility of a UE supporting D2D communication in a wireless mobile communication system can be provided.

BRIEF DESCRIPTION OF DRAWINGS

For a more complete understanding of the present disclosure and its advantages, reference is now made to the following description taken in conjunction with the accompanying drawings, in which like reference numerals represent like parts: disclosure

MODE FOR THE INVENTION

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged communication system.

The present disclosure can be applied to Long Term Evolution (LTE)/LTE-Advanced (LTE-A) systems corresponding to next generation mobile communication systems of the 3rd Generation Partnership Project (3GPP) as an example of the communication systems.

Device to Device (D2D) communication is a technology recently researched and enables a User Equipment (UE) to basically perform direct communication with another UE located adjacently to the UE.

Through the D2D communication technology, the UE can perform discovery (hereinafter, referred to as "D2D-D") in which the UE looks for UEs located adjacently to the UE itself and can perform direct communication (hereinafter, referred to as "D2D-C") with a UE requiring communication. Through the use of the D2D communication, it is possible to efficiently use radio resources in comparison with communication through a base station using the conventional wireless network. Further, through the use of the D2D communication, the UE can directly provide information to a UE which needs the information by using a method of discovering neighboring UEs, so that Social Networking Services (SNS) and advertisement services can be more efficiently supported.

Embodiments according to the present disclosure will be described in association with a user equipment (UE). The UE can be called a subscriber unit, a subscriber station, a mobile station, mobile, a remote station, a remote terminal, a mobile device, a user terminal, a terminal, a wireless communication device, a user agent, a user device, or a user equipment (UE). The UE can be a cellular phone, a Personal Digital Assistant (PDA), a handheld device having a radio access capability, a computing device, or another processing device connected to a wireless modem.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning.

In addition, a singular expression used in the specification includes a plural expression as long as they are clearly distinguished in the context. Throughout the specification, the terms such as "comprise" or "include" should not be construed as necessarily including all of the various component or steps described in the specification.

Hereinafter, embodiments of the present disclosure will be described in more detail with reference to the accompanying drawings.

Figure 1:
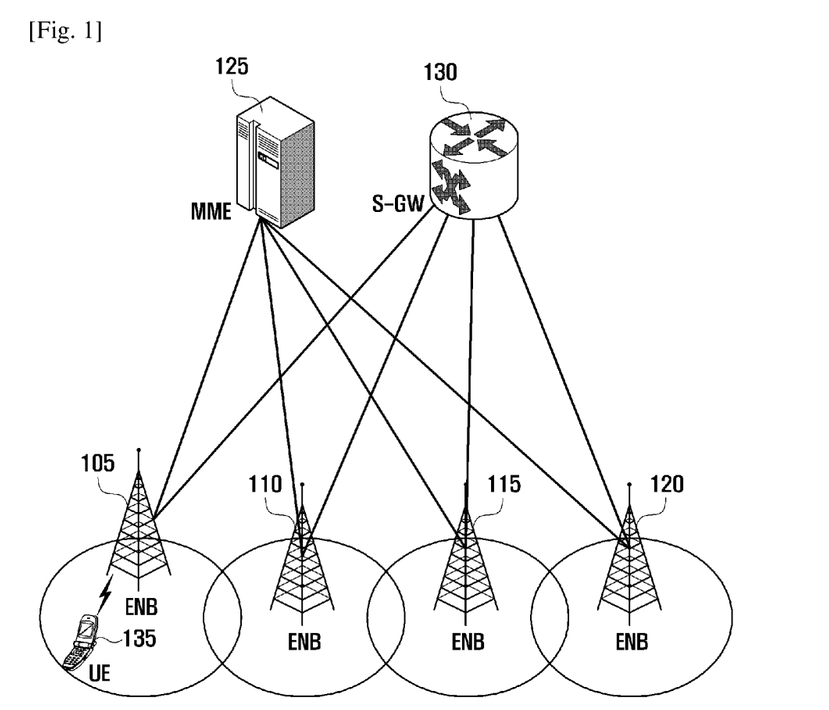
FIG. 1 illustrates an example of a 3GPP system structure according to this disclosure.

FIG. 1 illustrates an example of a 3GPP system structure according to this disclosure. Specifically, FIG. 1 illustrates an example of a 3GPP LTE system structure.

Referring to FIG. 1, a radio access network of the LTE mobile communication system includes next generation evolved node Bs (hereinafter, referred to as an ENB or an eNode B) 105, 110, 115 and 120, a Mobility Management Entity (MME) 125, and a Serving-Gateway (S-GW) 130.

A user equipment (UE) 135 accesses an external network through the ENBs 105, 110, 115, and 120 and the S-GW 130.

The ENBs 105, 110, 115, and 120 correspond to the existing node Bs of the UMTS system. The ENBs 105, 110, 115, and 120 are connected to the UE 135 through a radio channel and perform a more complex function in comparison with the existing node B. In LTE, since all user traffic including a real time service such as a Voice over IP (VoIP) through an Internet protocol (IP) are serviced through a shared channel, an apparatus for collecting and scheduling status information of UEs is used, and the ENB (105, 110, 115, and/or 120) serves as this apparatus.

One or more of the ENBs 105, 110, 115, and 120 generally controls a plurality of cells. In order to implement a maximum of a transmission rate of 100 Mbps, LTE uses Orthogonal Frequency Division Multiplexing (OFDM) in a maximum bandwidth of 20 MHz as a radio access technology. Further, an Adaptive Modulation and Coding (hereinafter, referred to as an AMC) scheme of determining a modulation scheme and a channel coding rate is applied to LTE according to a channel status of the UE.

The S-GW 130 is a device providing a data bearer, and generates or removes the data bearer under a control of the MME 125.

The MME 125 can perform various types of control functions of the wireless network and is connected to a plurality of ENBs 105, 110, 115, and 120.

Figure 2:
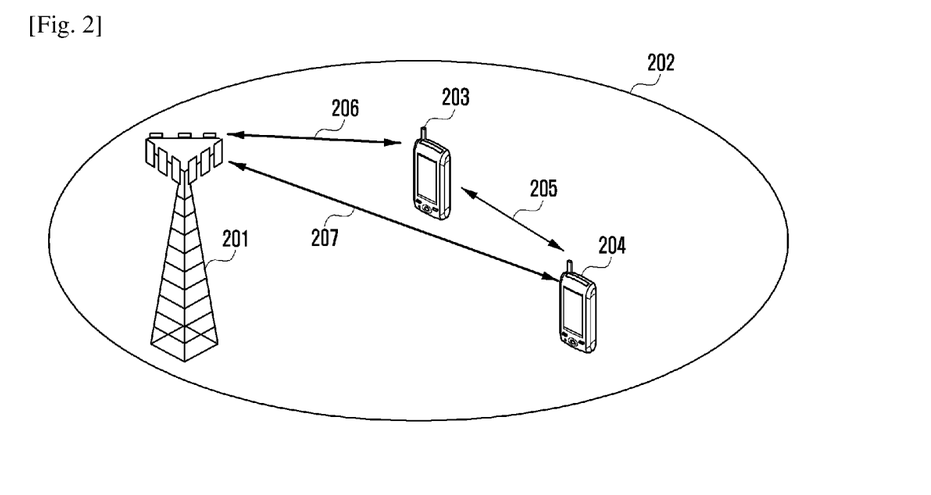
FIG. 2 is an example view describing device to device (D2D) communication according to this disclosure.

FIG. 2 is a view describing an example D2D communication according to this disclosure. Specifically, FIG. 2 illustrates an example in which D2D communication is performed within a cellular system.

An ENB 201 manages one or more UEs 203 and 204 located within a cell 202 managed by the ENB 201. A first UE 203 of the one or more UEs 203 and 204 performs cellular communication with the ENB 201 by using a first UE-ENB link 206 and the second UE 204 performs cellular communication with the ENB 201 by using a second UE-ENB link 207. When the first UE 203 and the second UE 204 perform the D2D communication, the first UE 203 and the second UE 204 directly exchange information by using a D2D link 205 without passing through the ENB 201.

Figure 3A:
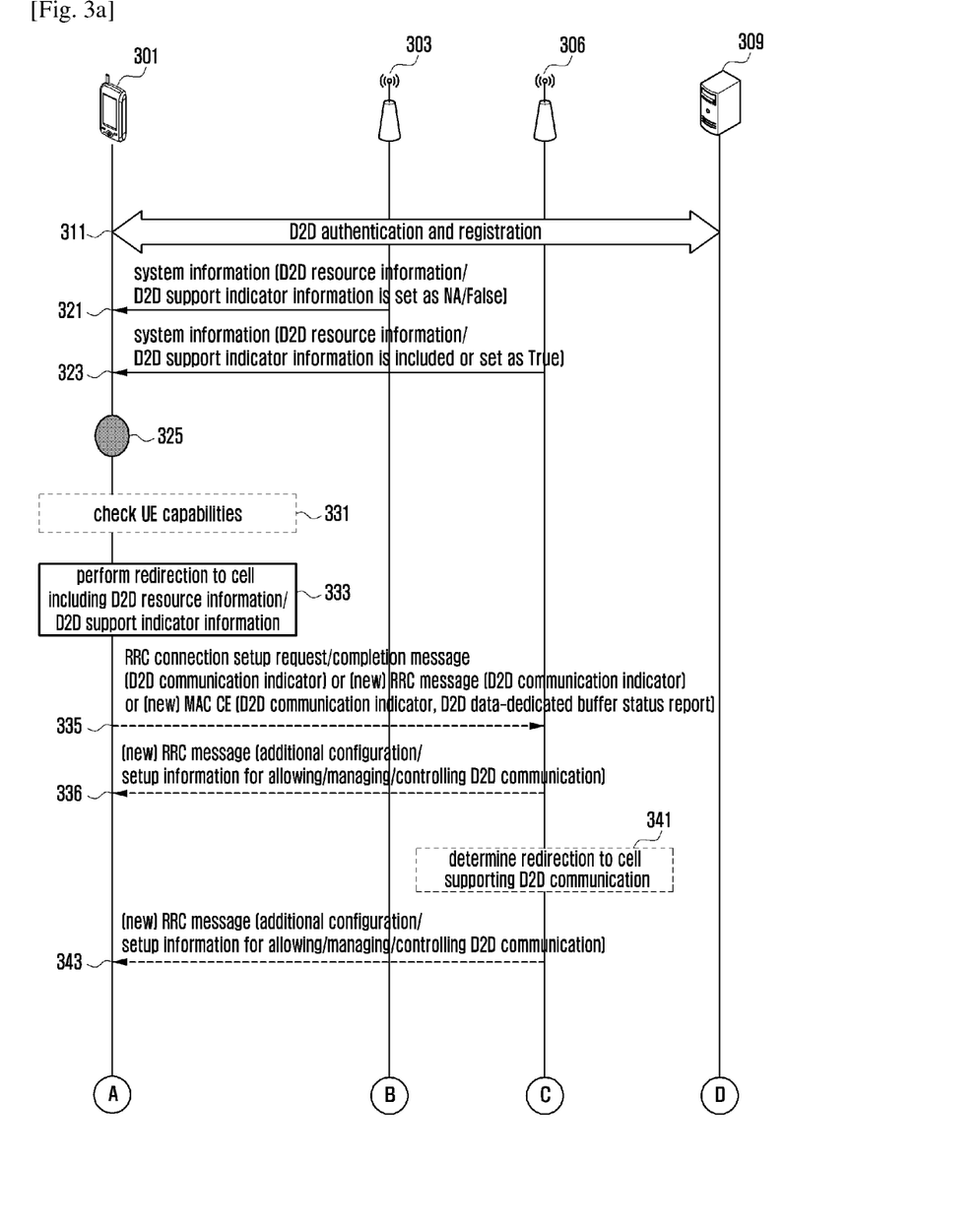
FIGS. 3A and 3B are flowcharts illustrating example D2D communication methods according to this disclosure.
Figure 3B:
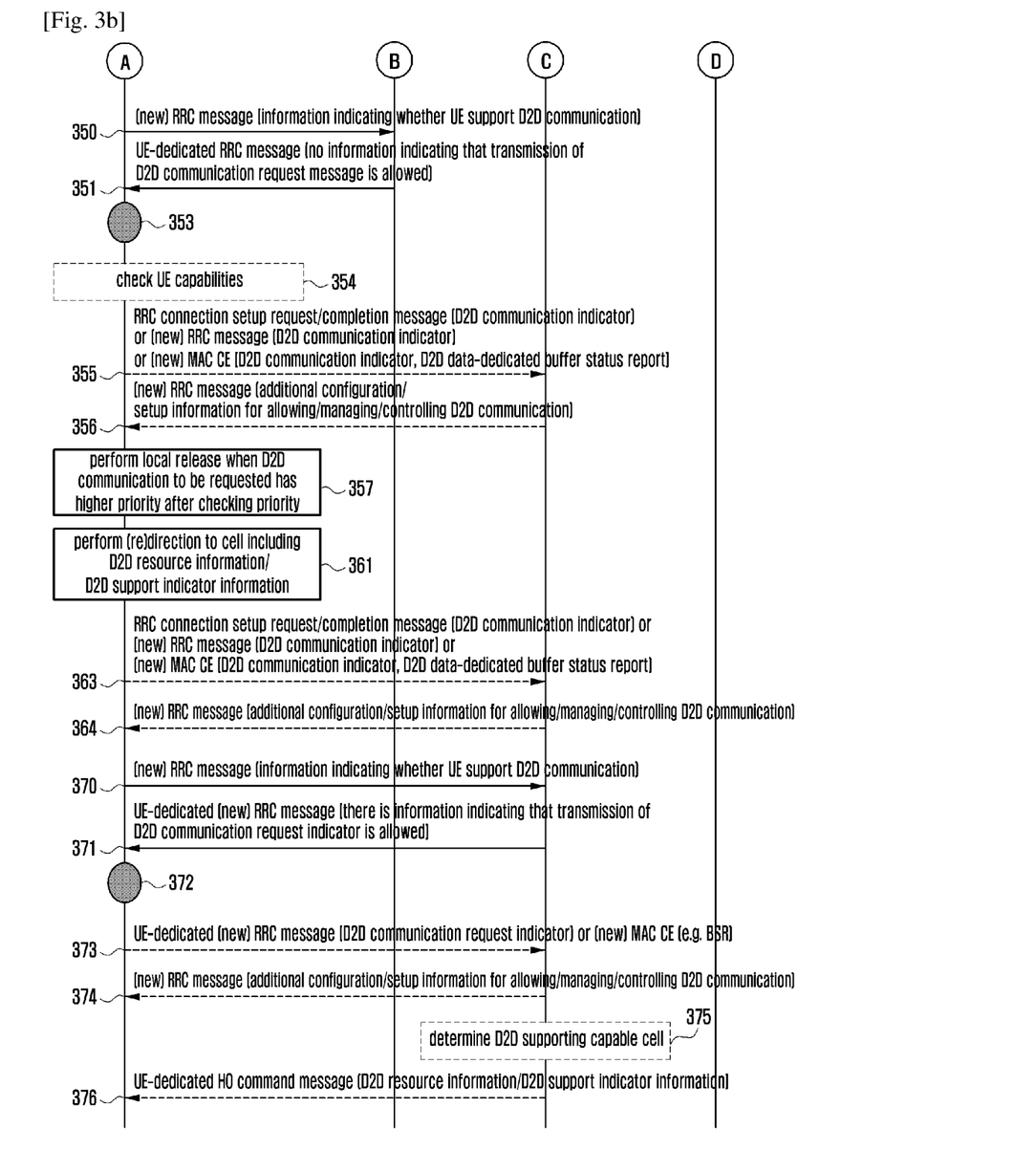

FIGS. 3A and 3B are flowcharts illustrating example D2D communication methods according to this disclosure.

In FIGS. 3A and 3B, a UE 301 supporting D2D communication communicates with one or more ENBs 303 and 306. A D2D server 309 serves to authenticate and register the UE 301 for the D2D communication, store information on a D2D UE, and transmit configuration information for the D2D communication to the D2D UE.

Referring to FIG. 3A, the D2D server 309 authenticates and registers the UE 301 through a D2D authentication/registration process with the UE 301 in step 311. The UE 301, having performed the D2D authentication/registration process, can actually trigger the D2D communication (D2D Discovery and/or D2D communication) later and the triggering can occur by driving a particular application for the D2D communication or generating data for the D2D communication. When the D2D communication is triggered, the UE 301 can be in a Radio Resource Control (RRC) idle state in which a connection with the ENB is not established in the 3GPP system or a RRC connected state in which the ENB has information on the UE 301 and exchange a control message dedicated for the UE 301.

FIG. 3A illustrates an operation performed in the RRC idle state when the D2D communication is actually triggered in the UE 301. FIG. 3B illustrates an operation performed in the RRC connected state when the D2D communication is actually triggered in the UE 301.

In FIG. 3A, it is assumed that the D2D communication is not supported in a cell controlled by the first ENB 303. At this time, the reason why the D2D communication is not supported can vary. For example, when the first ENB 303 is a previous release ENB which does not support the D2D communication, such that the first ENB 303 does not have a function for supporting the D2D communication even through the first ENB 303 is an ENB of a release supporting the D2D communication or such that the first ENB 303 temporarily does not support the D2D communication from a viewpoint of resource management, the D2D communication is not supported in a cell controlled by the first ENB 303. In the cell which does not support the D2D communication, the first ENB 303 transmits D2D resource configuration information or system information which does not include an indicator indicating that the D2D communication is supported or transmits an indicator indicating that the D2D communication is not supported through a broadcast channel within the cell in step 321.

Further, in FIG. 3A, it is assumed that the D2D communication is supported in a cell controlled by the second ENB 306. In the cell supporting the D2D communication, the second ENB 306 transmits D2D resource configuration information or an indicator indicating that the D2D communication is supported through system information broadcasted within the cell in step 323.

When the D2D communication is actually triggered in the UE 301 in the RRC idle state in step 325, the UE 301 checks the system information broadcasted by the first ENB 303 or the second ENB 306 within the cell and the capabilities of the UE in step 331. The UE 301 can stay in a 3GPP serving cell communicating with the current first ENB 303 or perform cell redirection to a cell of the second ENB 306 supporting the D2D communication in step 333 according to a result of the identification.

For example, if the UE 301 is in the cell in which the system information is broadcasted under a control of the first ENB 303 when a D2D communication triggering event is generated in the UE 301 (that is, the cell in which the first ENB 303 broadcasts the system information is a serving cell of the UE 301), the UE 301 can recognize that the D2D communication is not supported in the current serving cell through the system information received from the first ENB 303. Further, the UE 301 can recognize that the D2D communication is supported in an adjacent cell through the system information received from the second ENB 306 of the adjacent cell.

The UE 301 checks its own capabilities. Specifically, the UE 301 stays in the current serving cell and receives or transmits/receives required channels (for example, a paging channel, a system information transmission channel, a random access channel, and/or a downlink/uplink shared channel) in the serving cell, and simultaneously checks whether the D2D communication can be performed using D2D resources (for example, resources of a time domain and a frequency domain allocated for the D2D communication) indicated by the system information of the cell supporting the D2D communication.

When the UE stays in the serving cell and can perform the D2D communication by using the D2D resources indicated by the system information from the cell supporting the D2D communication while receiving or transmitting/receiving required channels in the serving cell, the UE 301 can stay in the serving cell without separately performing cell (re)direction for the D2D communication.

In contrast, when the UE 301 stays in the serving cell and cannot perform the D2D communication by using the D2D resources indicated by the system information from the cell supporting the D2D communication while receiving or transmitting/receiving required channels in the serving cell, the UE 301 performs cell (re)direction to an adjacent cell having transmitted D2D resource information or the system information including support indicator information indicating that the D2D communication is supported in step 333.

At this time, the UE 301 can select a cell which can be a target subject to the cell (re)direction according to an additional restrict condition. For example, (compared to the current serving cell) the UE 301 can perform the cell (re)direction to the cell only when a channel measurement result of the adjacent cell transmitting the system information including D2D resource information or support indicator information indicating that the D2D communication is supported satisfies a particular threshold or a particular condition. Alternatively, the UE 301 can perform the cell (re)direction to the cell only when the adjacent cell transmitting the system information including D2D resource information or support indicator information indicating that the D2D communication is supported is in another frequency band different from that of the current serving cell. The UE 301 can perform the cell (re)direction to the cell only when the above two conditions are all satisfied through a combination thereof.

When the UE cannot perform the D2D communication by using the D2D resources indicated by the system information transmitted from the cell supporting the D2D communication while staying in the serving cell and cannot perform the cell (re)direction to the adjacent cell transmitting the system information including the D2D resource information or the support indicator information indicating that the D2D communication is supported, the UE/user/application determines priorities of a service to use a 3GPP network and a service to use D2D communication and operates according to preference having a higher priority. When the service using the 3GPP network has a higher priority than the service using the D2D communication, the UE 301 stays in the current serving cell. In contrast, when the service using the D2D communication has a higher priority than the service using the 3GPP network, the UE 301 cannot perform the cell (re)direction to the adjacent cell transmitting the D2D resource information or the support indicator information indicating that the D2D communication is supported through the system information, but performs the D2D communication by using the D2D resource information while not staying in the current serving cell.

In an embodiment, where the UE 301 cannot perform the cell (re)direction to the adjacent cell can occur, for example, when the UE is barred access to the adjacent cell by the system information in the adjacent cell. Embodiment where it is determined that the UE is barred access to a particular cell will be described in detail with reference to the 3GPP standard TS36.304 "E-UTRA UE procedures in idle mode".

In an embodiment, a step in which the UE 301 checks its own capabilities can be omitted. That is, the UE 301 does not check if the UE can perform the D2D communication by using the D2D resources indicated by the system information from the cell supporting the D2D communication while receiving or transmitting/receiving required channels in the serving cell in a state where the UE stays in the serving cell, and can perform the cell (re)direction to the adjacent cell transmitting the D2D resource information or the support indicator information indicating that the D2D communication is supported as the system information. When the cell (re)direction to the adjacent cell transmitting the D2D resource information or the support indicator information indicating that the D2D communication is supported as the system information cannot be performed, the UE 301 can determine priorities of the service to use the 3GPP network and the serving to use the D2D communication and operate according to the preference having a higher priority as described above.

In using the D2D communication, the UE 301 can recognize the D2D resource indicated by the system information by itself and use the recognized D2D resources or can apply for the right to use the D2D resources before the use and receive approval for use.

When the UE 301 is required to receive the approval for use from the ENB, the UE 301 makes a request for using the D2D communication to the second ENB 306 controlling a cell, in which the UE 301 transmits the D2D resource information or the support indicator information indicating that the D2D communication is supported as the system information, in order to use the D2D communication in the cell in step 335. Information for making a request for using the D2D communication (D2D communication indicator) can be included in an RRC connection establishment request message or an RRC connection setup completion message. However, the information for making the request for using the D2D communication can be included in a different type of existing RRC message or a new type of RRC message. Alternatively, the information for making the request for using the D2D communication can be transmitted using a (new) MAC Control Element (CE). The MAC CE can be, for example, a buffer status report MAC CE having a new format (at least including an indicator indicating a buffer status report for the D2D communication and information on a size of data buffered for the D2D communication). A detailed format and a content of the buffer status report used in 3GPP will refer to the 3GPP standard TS36.321 "E-UTRA MAC Protocol Specification". In the LTE system, the RRC connection establishment request message can be mapped to an RRCConnectionRequest message defined in the 3GPP standard TS36.331 "E-UTRA Radio Resource Control Protocol Specification" and the RRC connection setup completion message can be mapped to an RRCConnectionSetupComplete message defined in the 3GPP standard TS36.331. A more detailed description of the RRC messages refers to the 3GPP standard.

The second ENB 306 having received the request for using the D2D communication signals additional configuration/setup information for the D2D communication or a D2D communication acceptance indicator to the UE 301 and allow/control/manage the UE 301 to perform the D2D communication in step 336.

The second ENB 306 also redirects the UE to another cell supporting the D2D communication in steps 341 and 343. At this time, the second ENB 306 transmits, to the UE 301, an RRC connection setup rejection message or an RRC connection setup release message for redirecting the UE. In the LTE system, the RRC connection setup rejection message or the RRC connection setup release message can be mapped to an RRCConnectionReject message or an RRCConnectionRelease message defined in the 3GPP standard TS36.331. The RRC connection setup rejection message or the RRC connection setup release message can include D2D resource information to be used in a target cell or a D2D resource indicator indicating re-transmission for the use of the D2D communication (or an indicator indicating that the target cell re-transmitting the UE supports the D2D communication). FIG. 3B illustrates an operation performed in the RRC connected state when the D2D communication is actually triggered in the UE 301. In this case, the operations of steps 311 to 321/323 described in FIG. 3A can be equally performed. The UE 301 is in an RRC connected state. When a cell controlled by the first ENB 303 is a serving cell of the UE 301, the UE 301 can operate as follows.

When the UE 301 is in the RRC connected state (in response to a request for capability information of the UE 301 from the first ENB 303) the UE 031 transmits its own capability information indicating whether the D2D communication is supported to the first ENB 303 of the serving cell in step 350.

Since it is assumed that the D2D communication is not supported in the cell controlled by the first ENB 303, an RRC message dedicated for the UE transmitted by the first ENB 303 may not include information indicating that transmission of a D2D communication request indicator by the UE 301 in the current serving cell is allowed in step 351.

The UE 301 has not received D2D communication request indicator transmission acceptance information using the current cell through the RRC message dedicated for the UE (even though the UE 301 has transmitted its own capability information indicating that the D2D communication is supported in the cell), so that the UE 301 considers that the D2D communication is not supported in the cell. Accordingly, when the D2D communication is actually triggered in the UE 301 in step 353, the UE 301 receives system information from the adjacent cell.

When there is the adjacent cell broadcasting the system information as described in step 323 of FIG. 3A, the UE 301 checks its own capabilities in step 354. Specifically, the UE 301 checks whether the UE 301 can perform the D2D communication by using the D2D resources indicated by the system information from the adjacent cell while transmitting/receiving data in the serving cell in a state where the UE 301 stays in the current serving cell.

When the UE performs the D2D communication using the D2D resources indicated by the system information from the adjacent cell while transmitting/receiving data in the serving cell, the UE 301 can perform the D2D communication by using the D2D resources while staying in the serving cell.

In using the D2D communication, the UE 301 can recognize the D2D resources indicated by the system information by itself and use the recognized D2D resources or can apply for the right to use the D2D resources to the ENB before the use and receive an approval for use from the ENB. When the latter method is applied, in the cell transmitting the D2D resource information or the support indicator information indicating that the D2D communication is supported as the system information, the UE 301 can make a request for using the D2D communication to the second ENB 306 controlling the cell and receive the approval for use of the D2D communication from the second ENB 306 in steps 355 and 356.

Information for making a request for using the D2D communication (D2D communication indicator) can be included in an RRC connection establishment request message or an RRC connection setup completion message. However, the information for making the request for using the D2D communication can be included in a different type of existing RRC message or a new type of RRC message. Alternatively, the information for making the request for using the D2D communication can be transmitted using a (new) MAC Control Element (CE). The MAC CE can be, for example, a buffer status report MAC CE having a new format (at least including an indicator indicating a buffer status report for the D2D communication and information on a size of data buffered for the D2D communication) or a MAC CE including D2D communication indicator information. A detailed format and a content of the buffer status report used in 3GPP will refer to the 3GPP standard TS36.321 "E-UTRA MAC Protocol Specification". In the LTE system, the RRC connection establishment request message can be mapped to an RRCConnectionRequest message defined in the 3GPP standard TS36.331 "E-UTRA Radio Resource Control Protocol Specification" and the RRC connection setup complete message can be mapped to an RRCConnectionSetupComplete message defined in the 3GPP standard TS36.331.

The second ENB 306 having received the request for using the D2D communication signals additional configuration/setup information for the D2D communication or a D2D communication acceptance indicator to the UE 301 and allows/controls/manages the UE 301 to perform the D2D communication in step 356.

In contrast, when the UE cannot perform the D2D communication by using the D2D resources indicated by the system information from the adjacent cell while transmitting/receiving in the serving cell, the UE/user/application determines priorities of the service to use the 3GPP network and the service to use the D2D communication and operates according to the preference having a higher priority.

When the service using the 3GPP network has a higher priority than the service using the D2D communication, the UE 301 gives up/terminates the D2D communication while staying in the current serving cell.

In contrast, when the service using the D2D communication has a higher priority than the service using the 3GPP network, the UE 301 actively disconnects the RRC connection with the first ENB 303 (perform local release) in step 357 and performs cell (re)direction to the adjacent cell transmitting the D2D resource information or the support indicator information indicating that the D2D communication is supported as the system information in step 361. The UE 301 can self-release the RRC connection without an RRC connection release command from the ENB through the local release and disconnect the RRC connection without any notification/request to the ENB when the UE 301 releases the RRC connection.

The UE 301 performs an RRC connection setup procedure with respect to the second ENB 306 controlling the (re)selected cell.

In using the D2D communication, the UE 301 can recognize the D2D resources indicated by the system information by itself and use the recognized D2D resources or can apply for the right to use the D2D resources to the ENB before the use and receive an approval for use from the ENB. When the UE is required to receive the approval for use from the ENB, the UE 301 can make a request for using the D2D communication to the second ENB 306 controlling the (re)selected cell and receive the approval for use of the D2D communication from the second EBN 306 in steps 363 and 364. Information for making a request for using the D2D communication (D2D communication indicator) can be included in an RRC connection setup request message or an RRC connection setup completion message. However, the information for making the request for using the D2D communication can be included in a different type of existing RRC message or a new type of RRC message. Alternatively, the information for making the request for using the D2D communication can be transmitted using a (new) MAC Control Element (CE). The MAC CE can be, for example, a buffer status report MAC CE having a new format (at least including an indicator indicating a buffer status report for the D2D communication and information on a size of data buffered for the D2D communication) or a MAC CE including D2D communication indicator information.

The second ENB 306 having received the request for using the D2D communication signals additional configuration/setup information for the D2D communication or a D2D communication acceptance indicator to the UE 301 and allow/control/manage the UE 301 to perform the D2D communication in step 364.

In an embodiment, a step in which the UE 301 checks its own capabilities can be omitted. That is, the UE 301 may not check if the UE 301 can perform the D2D communication by using the D2D resources indicated by the system information from the cell supporting the D2D communication while transmitting/receiving data in the serving cell in a state where the UE 301 stays in the serving cell and the UE/user/application determines priorities the service to use the 3GPP network and the service to use the D2D communication and operates according to the preference having a higher priority.

When the D2D communication is actually triggered in step 353, the UE 301 is in the RRC connected state. When the cell controlled by the second ENB 306 is the serving cell, the UE 301 can perform operations in steps 370 to 376 of FIG. 3B.

When the UE 301 is in the RRC connected state (in response to a request for capability information of the UE 301 from the second ENB 306), the UE 301 transmits its own capability information indicating whether the D2D communication is supported to the second ENB 306 of the serving cell in step 370.

Since it is assumed that the D2D communication is supported in the cell controlled by the second ENB 306, an RRC message dedicated for the UE transmitted by the second ENB 306 can include information indicating that transmission of a D2D communication request indicator by the UE 301 in the current serving cell is allowed in step 371.

When the D2D communication is actually triggered in step 372, the UE 301 performs the D2D communication by using the D2D resources while staying in the serving cell. In using the D2D communication, the UE 301 can recognize the D2D resources indicated by the system information by itself and use the recognized D2D resources or can apply for the right to use the D2D resources to the ENB before the use and receive an approval for use from the ENB. When the latter method is applied, the UE 301 can make a request for using the D2D communication to the second ENB 306 controlling the serving cell and receive an approval for use of the D2D communication from the second ENB 306 in steps 373 and 374.

Information for making a request for using the D2D communication can be inserted into the existing RRC message or a new RRC message and then transmitted, or a (new) MAC Control Element (CE) for example, a buffer status report MAC CE having a new format (at least including an indicator indicating a buffer status report for the D2D communication and information on a size of data buffered for the D2D communication) or a MAC CE including D2D communication indicator information can be defined and then transmitted. A detailed format and a content of the buffer status report used in 3GPP will refer to the 3GPP standard TS36.321 "E-UTRA MAC Protocol Specification". The corresponding ENB having received the 373 message signals the additional configuration/setup information for the D2D communication or the D2D communication acceptance indicator and allow/control/manage the UE to perform the D2D communication in step 374.

When the UE 301 receives information indicating that transmission of a D2D communication request indicator is allowed through the RRC message dedicated for the UE but the D2D resource information does not exist in the system information of the current serving cell and the UE has not received the D2D resource information through the message dedicated for the UE, the UE 301 can insert D2D communication available frequency information set in the UE, all or some of the operator (Public Land Mobile Network: PLMN) information (for example, Mobile Country Code (MCC) information which is part of the PLMN information), and Tracking Area Code (TAC) information into the RRC message dedicated for the UE and transmit the RRC message dedicated for the UE. The present disclosure includes a method of inserting the information indicating the D2D communication available frequency information set in the UE 301, all or some of the operator (Public Land Mobile Network: PLMN) information (for example, Mobile Country Code (MCC) information which is part of the PLMN information), and Tracking Area Code (TAC) information into the 373 message and transmitting the 373 message regardless of the above specific condition ("the UE receives information indicating that transmission of the D2D communication request indicator by the UE is allowed through the RRC message dedicated for the UE but the D2D resource information does not exist in the system information of the current serving cell and the UE has not received the D2D resource information through the message dedicated for the UE").

When there is a D2D communication supporting cell from among the adjacent cells satisfying the received information condition with reference to the received information, the second ENB 306, having received the information, can hand over the UE 301 to the cell in steps 375 and 376. In the LTE system, the RRC message instructing the UE 301 to perform the handover can be mapped to an RRCConnectionReconfiguration message including mobilityControlInfo information defined in the 3GPP standard TS36.331, and the RRC message can include D2D resource information to be used by a handover target cell (or an indicator indicating that the target cell subject to the handover supports the D2D communication) or an indicator indicating the handover for the use of the D2D communication.

Although FIGS. 3A and 3B illustrate that the D2D resource information or the indicator information indicating that the D2D communication is supported are transmitted by each cell through each of the pieces of system information, the resource information or the indicator information indicating that the D2D communication is supported can be configured for each frequency, not each cell. In this case, the configured information may not be transmitted by the system information in the cell, but may be transmitted to the corresponding UE 301 from the D2D server 309 during step 311 of performing the D2D use approval and registration process. The embodiment of the present disclosure illustrated in FIGS. 3A and 3B can be applied at this time. However, in this case, the serving cell/adjacent cell transmitting the D2D resource information or the indicator information indicating that the D2D communication is supported by the system information is re-mapped to a serving cell/adjacent cell in a frequency to which the D2D resources are set or a frequency indicating that the D2D communication is supported and the serving cell/adjacent cell which does not transmit the D2D resource information or the indicator information indicating that the D2D communication is supported by the system information is re-mapped to a serving cell/adjacent cell in a frequency different from the frequency to which the D2D resources are set or the frequency indicating that the D2D communication is supported. Further, in this case, the operation is made only when frequency information is included in the system information (in the 3GPP LTE system, frequency information of the current serving cell and frequency information of adjacent cells are transmitted as system information) as serving/adjacent frequency information in the serving cell. For example, the UE 301 can receive D2D resources of an F1 frequency from the D2D server. Then, when the D2D communication is triggered, the UE 301 can perform the D2D communication according to the present disclosure only when system information of the current serving cell includes F1 information (in a case where the F1 frequency is a downlink frequency) or downlink frequency information (in a case where the F1 frequency is an uplink frequency) mapped to the F1 as serving frequency and/or adjacent frequency information. When the serving cell system information does not include the serving frequency and/or adjacent frequency information, the UE 301 may not perform any separate operation for the D2D communication and follow the existing operation defined in the 3GPP system.

Figure 4:
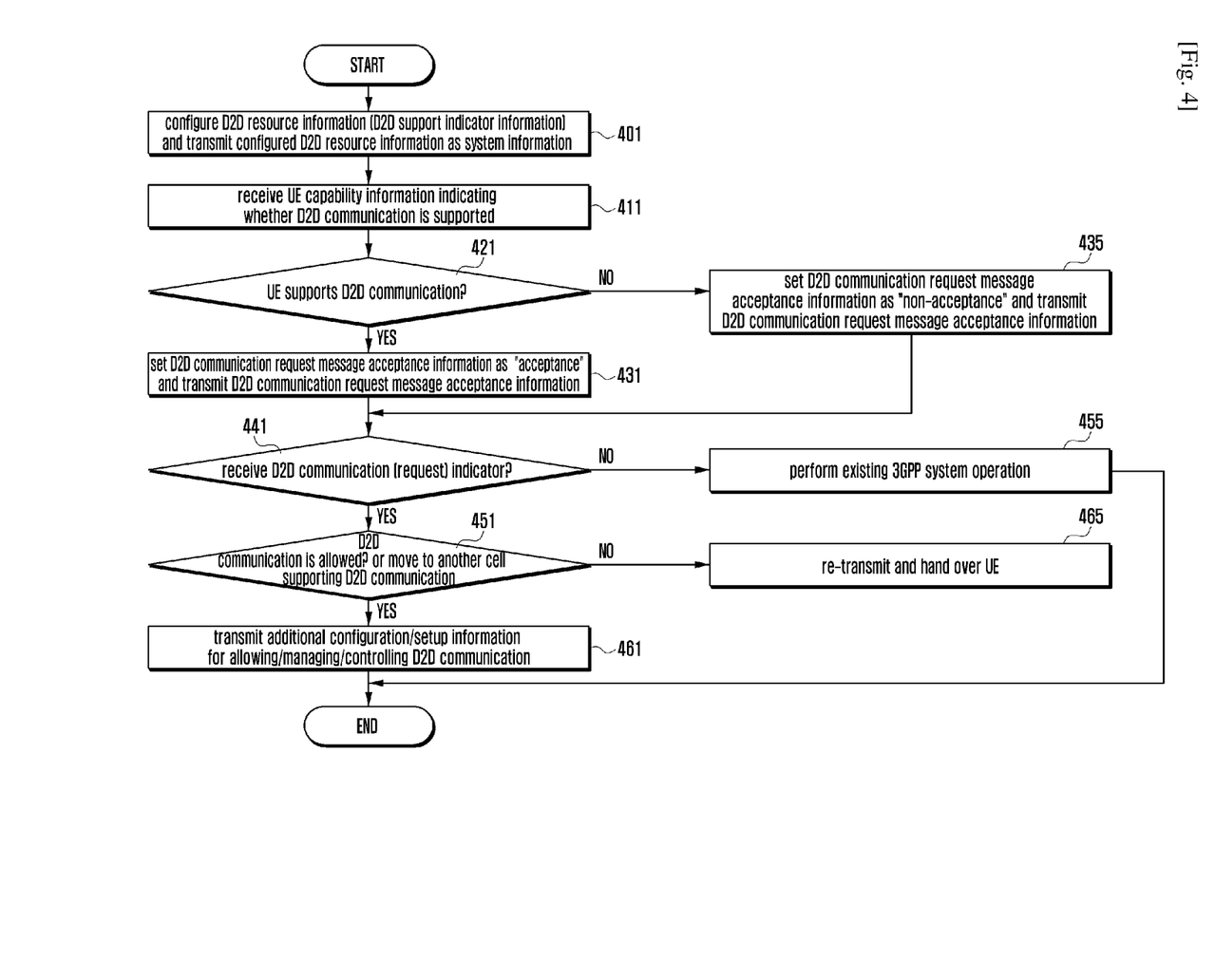
FIG. 4 is a flowchart illustrating an example D2D communication method of a network device according to this disclosure.

FIG. 4 is a flowchart illustrating an example D2D communication method of a network device (for example, the ENB) according to this disclosure.

In a cell supporting the D2D communication, the ENB controlling the cell configures D2D resource information or indicator information indicating the D2D communication is supported and broadcasts the configured information to the cell as system information in step 401. The ENB receives capability information of the UE indicating whether the D2D communication is supported from the particular UE in step 411. The ENB checks whether the information is set such that the corresponding UE supports the D2D communication in step 421.

When the information is set such that the D2D communication is supported, the ENB sets information indicating whether transmission of a D2D communication request message to the UE is allowed as "acceptance" and transmits the information through the control message dedicated for the UE in step 431.

In contrast, when the information is not set such that the D2D communication is supported, the ENB sets the information indicating whether transmission of the D2D communication request message to the UE is allowed as "non-acceptance" and transmits the information through the control message dedicated for the UE in step 435.

When the ENB receives information for making a request for using the D2D communication from a particular UE in step 441 and determines to allow the UE to use the D2D communication in step 451, the ENB can signal additional configuration/setup information for the D2D communication or a D2D communication acceptance indicator to the UE and allow/control/manage the UE to perform the D2D communication in step 461.

When the ENB receives the information for making the request for using the D2D communication from the particular UE in step 441 and determines to move the UE to another cell supporting the D2D communication in step 451, the ENB redirects the UE to a particular cell or hands over the UE in step 465. At this time, the ENB can transmit a command message instructing the UE to perform the redirection or handover and insert D2D resource information of a target cell or an indicator indicating the handover to use the D2D communication (the target cell supports the D2D communication) into the command message.

When the ENB does not receive the information for making the request for using the D2D communication from the particular UE, the ENB can perform the operation in the existing 3GPP system without performing a separate operation for supporting the D2D communication in step 455.

Figure 5A:
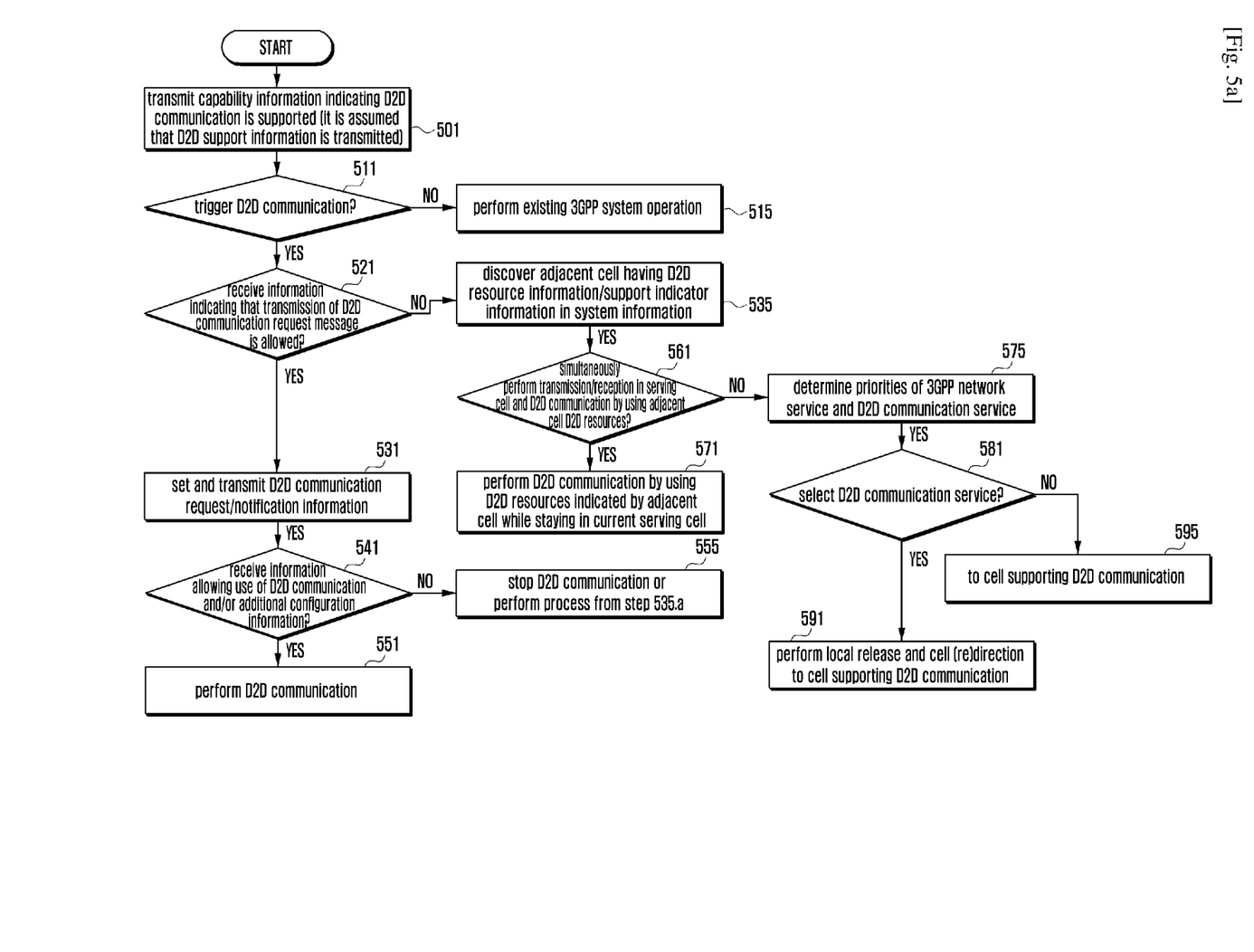
FIGS. 5A and 5B are flowcharts illustrating example D2D communication methods of a UE according to this disclosure.
Figure 5B:
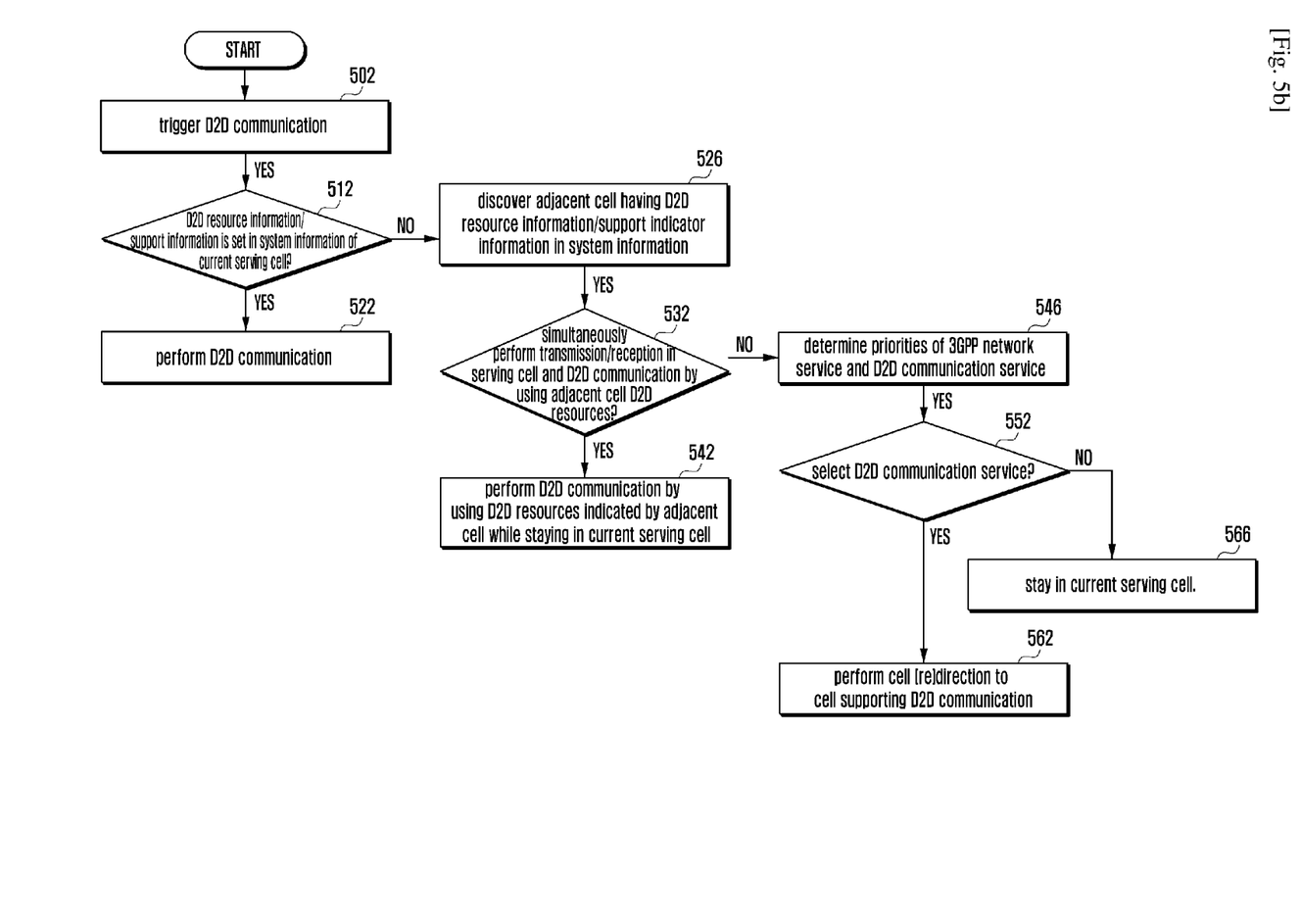

FIGS. 5A and 5B are flowcharts illustrating example D2D communication methods of the UE according to this disclosure. FIG. 5A illustrates operations of the UE in the RRC connected state and FIG. 5B illustrates operations of the UE in the RRC idle state.

Referring to FIG. 5A, the UE in the RRC connected state transmits its own capability information indicating whether the D2D communication is supported to the ENB in step 501. The capability information of the UE indicating whether the D2D communication is supported can be transmitted without any request from the ENB or transmitted necessarily with a request from the ENB. In FIG. 5A, it is assumed that the information indicating whether the D2D communication is supported is set as D2D communication resources.

When the D2D communication is triggered in the UE (for example, the UE executes an application in which the D2D communication is set and receives data/control information for the D2D communication from the application) in step 511, the UE checks whether the UE has received information indicating that transmission of a message making a request for using the D2D communication is allowed from the previous ENB in step 521.

When the UE has previously received the information indicating that the transmission of the message making the request for using the D2D communication is allowed from the ENB, the UE transmits D2D communication use request information inquiring about whether the use of the D2D communication is allowed, by using the D2D resources indicated by the system information in the cell, to the ENB in step 531. Further, the UE can transmit D2D communication available frequency information, all or some of the operator (PLMN) information (for example, MCC information from among the PLMN information), and TAC information which are set to the UE to the ENB.

Thereafter, when the UE receives information allowing the use of the D2D communication (and/or additional configuration information required for the D2D communication) from the ENB in step 541, the UE can perform the D2D communication by using the D2D resources indicated by the system information in the cell in step 551.

When the UE does not receive the information allowing the use of the D2D communication in step 541, the UE can stop the D2D communication or return to step 535 to perform the operation of the UE in step 555. Although not illustrated in step 555, if the UE starts a particular timer (Timer N) after transmitting the information of step 531 and cannot receive the information allowing the use of the D2D communication before the timer expires, the UE can re-perform step 531. The re-performance of step 531 by the timer is repeated only by a set particular maximum number of times (Count V). When the timer expires during the maximum number of times or the UE has not received the information allowing the use of the D2D communication even through the D2D communication use request information has been repeatedly transmitted, the UE can stop the D2D communication or return to step 535 to perform the operation of the UE.

When the UE has not received the information allowing the transmission of the message making the request for using the D2D communication in step 521, the UE discovers an adjacent cell in which the D2D resource information or the support indicator information indicating that the D2D communication is supported are set in the system information in step 535. Although not illustrated in FIG. 5, particular conditions can be applied to discover the adjacent cell. For example, the UE can limit the adjacent cells to be discovered to adjacent cells in a frequency band different from a frequency band of the current serving cell or adjacent cells having a channel measurement result satisfying a particular threshold.

When the UE discovers a corresponding adjacent cell in step 535, the UE checks the UE capabilities indicating whether the UE can perform the D2D communication by using the D2D resources indicated by the adjacent cell while transmitting/receiving data in the current serving cell in step 561.

When the UE can perform the D2D communication by using the D2D resources indicated by the adjacent cell while transmitting/receiving the data in the current serving cell, the UE performs the D2D communication by using the D2D resources indicated by the adjacent cell while staying in the current serving cell in step 571.

In contrast, when the UE cannot perform the D2D communication by using the D2D resources indicated by the adjacent cell while transmitting/receiving the data in the current serving cell, the UE determines priorities of (a service using) the 3GPP network and (a service using) the D2D communication in step 575. The determination of the priorities can be performed in a UE/application/user level. When the D2D communication (service) is preferred in step 581, the UE performs a local release and cell (re)direction to the adjacent cell in step 591. In contrast, when the D2D communication (service) is not preferred, the UE performs the operation defined in the 3GPP system while staying the current serving cell in step 595.

In using the D2D communication, the UE can recognize the D2D resources indicated by the system information by itself and use the recognized D2D resources or can apply for the right to use the D2D resources to the ENB before the use and receive an approval for use from the ENB. When the former method is applied, the process in which the UE makes a request for using the D2D communication to the ENB and receive the approval for use of the D2D communication from the ENB can be omitted.

Referring to FIG. 5B, when the D2D communication is triggered in the UE in step 502, the UE in the RRC idle state checks whether the D2D resource information or the support indicator information indicating that the D2D communication is supported is configured/set in system information of the current serving cell in step 512. When the D2D resource information or the support indicator information indicating that the D2D communication is supported is configured/set in the system information of the current serving cell, the UE performs the D2D communication by using the resources in step 522. In contrast, when the D2D resource information or the support indicator information indicating that the D2D communication is supported is not configured/set in the system information of the current serving cell, the UE discovers an adjacent cell in which the D2D resource information or the support indicator information indicating that the D2D communication is supported is set in the system information in step 526. Although not illustrated in FIG. 5B, particular conditions can be applied when the UE discovers the adjacent cell. For example, the UE can limit the adjacent cells to be discovered to adjacent cells in a frequency band different from a frequency band of the current serving cell or adjacent cells having a channel measurement result satisfying a particular threshold.

When the UE discovers a corresponding adjacent cell in step 526, the UE checks the UE capabilities indicating whether the UE can perform the D2D communication by using the D2D resources indicated by the adjacent cell while transmitting/receiving required channels in the current serving cell in step 532.

When the UE can perform the D2D communication by using the D2D resources indicated by the adjacent cell while transmitting/receiving the required channels in the current serving cell, the UE performs the D2D communication by using the D2D resources indicated by the adjacent cell while staying in the current serving cell in step 542.

In contrast, when the UE cannot perform the D2D communication by using the D2D resources indicated by the adjacent cell while transmitting/receiving the required channels in the current serving cell, the UE determines priorities of (a service using) the 3GPP network and (a service using) the D2D communication in step 546. The determination of the priorities can be performed in a UE/application/user level. When the D2D communication (service) has a higher priority in step 552, the UE performs the cell (re)direction to the adjacent cell in step 562. In contrast, when the D2D communication (service) is not preferred, the UE performs the operation defined in the 3GPP system while staying the current serving cell in step 566.

In using the D2D communication, the UE can recognize the D2D resources indicated by the system information by itself and use the recognized D2D resources or can apply for the right to use the D2D resources to the ENB before the use and receive an approval for use from the ENB. When the latter method is applied, the process in which the UE makes a request for using the D2D communication to the cell (serving cell or adjacent cell) transmitting the D2D resource information or the support indicator information indicating that the D2D communication is supported as the system information can be included to allow the UE to use the D2D communication.

Figure 6:
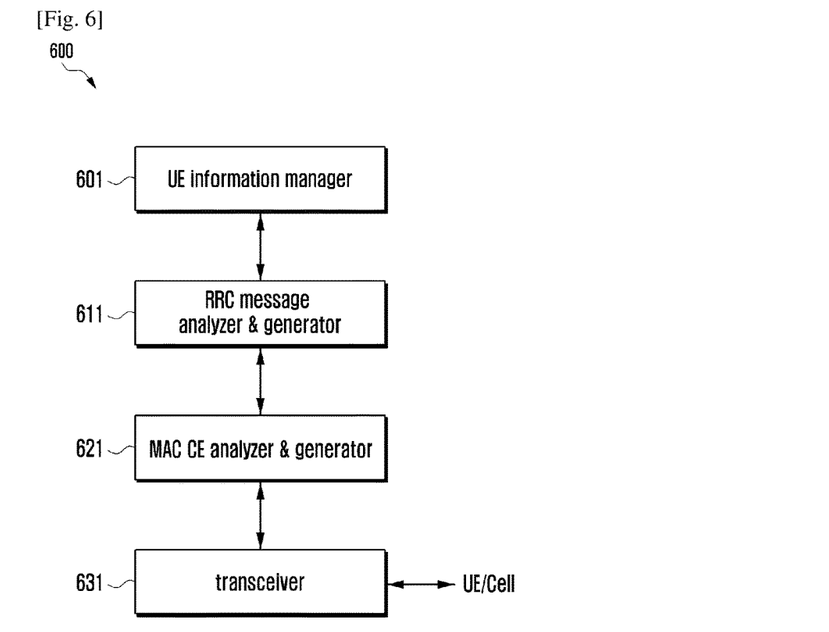
FIG. 6 is a block diagram illustrating an example structure of a network device according to this disclosure.

FIG. 6 is a block diagram illustrating an example structure of a network device 600 (for example, the ENB) according to this disclosure.

A transceiver 631 can transmit system information within a cell controlled by the network device and transmit/receive data/a control message dedicated for the UE to/from the UE within the cell.

An RRC message analyzer & generator 611 generates system information and a message dedicated for the UE to be transmitted in an RRC layer and analyzes the message dedicated for the UE. A MAC CE analyzer & generator 621 generates control information dedicated for the UE to be transmitted in a MAC layer and analyzes the received control information dedicated for the UE. Capability information, indicating whether the D2D communication is supported by or received from the UE, is managed by a UE information manager 601.

Figure 7:
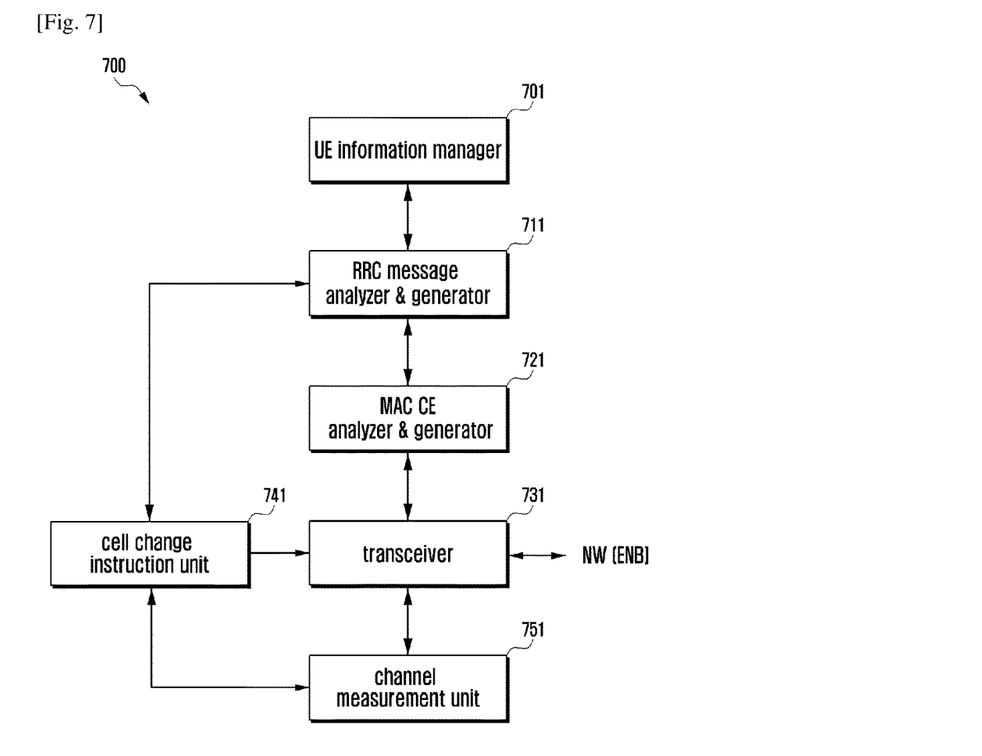
FIG. 7 is a block diagram illustrating an example structure of a UE according to this disclosure.

FIG. 7 is a block diagram illustrating an example structure of the UE 700 according to this disclosure.

A transceiver 731 can transmit/receive data/a control message to/from the network (ENB). An RRC message analyzer & generator 711 analyzes receives system information and a control message dedicated for the UE in an RRC layer and generates the control message dedicated for the UE in the RRC layer to be transmitted. A MAC CE analyzer & generator 721 analyzes and generates control information dedicated for the UE in a MAC layer.

Capability information of the UE is managed by a UE information manager 701 and the capability information of the UE can include D2D related UE capability information. D2D resource information can be managed by the RRC message analyzer & generator 711 and a cell change instruction unit 741 determines whether to stay in the current serving cell or change the serving cell to another cell based on a channel measurement result of the serving cell and the adjacent cell performed by a channel measurement unit 751 and D2D related resource information and control information received by system information and a control message dedicated for the UE and instructs the transceiver 731 to perform an operation according to the determination.

Although the present disclosure has been described with an exemplary embodiment, various changes and modifications can be suggested to one skilled in the art. It is intended that the present disclosure encompass such changes and modifications as fall within the scope of the appended claims.

The invention claimed is:

1. A method for communicating by a first terminal, the method comprising:
  determining that a trigger to establish a device-to-device (D2D) communication is occurred;
  identifying, when the trigger is occurred, whether first system information indicating that a first cell serving the first terminal supports the D2D communication is received from the first cell associated with a first frequency for the D2D communication;
  receiving second system information indicating that a second cell adjacent to the first cell supports the D2D communication from the second cell associated with a second frequency for the D2D communication, when the first system information is not received from the first cell;
  determining a priority between the D2D communication and a cellular network service, in case the first terminal cannot perform the D2D communication by using a D2D resource of the second cell while communicating in the first cell;

performing a cell reselection to the second cell, if the priority of the D2D communication is higher than the cellular network service; and transmitting, to the second cell, a control message for requesting to use the D2D resource of the second cell for the D2D communication with a second terminal served by the second cell, the D2D resource being indicated by the second system information.

2. The method of claim 1, the method further comprises:
receiving a reconfiguration message in response to the control message, the reconfiguration message including bandwidth information associated with the D2D communication from the second cell.

3. The method of claim 2, wherein the control message comprises a medium access control control element (MAC CE) including an indicator for a buffer status report for the D2D communication and information on a size of data buffered for the D2D communication.

4. The method of claim 1, the method further comprises:
receiving, from the second cell, a command message instructing the first terminal to perform a handover to a target cell, when the second cell determines to redirect the first terminal to the target cell.

5. The method of claim 4, wherein the command message comprises at least one of D2D resource information of the target cell and an indicator indicating the handover to use the D2D communication.

6. A first terminal for communicating, the first terminal comprising:
a transceiver configured to transmit and receive a signal; and
a controller configured to:
determine that a trigger to establish a device-to-device (D2D) communication is occurred,
identify, when the trigger is occurred, whether first system information indicating that a first cell serving the first terminal supports the D2D communication is received from the first cell associated with a first frequency for the D2D communication,
control the transceiver to receive second system information indicating that a second cell adjacent to the first cell supports the D2D communication from the second cell associated with a second frequency for the D2D communication, when the first system information is not received from the first cell,
determine a priority between the D2D communication and a cellular network service, in case the first terminal cannot perform the D2D communication by using a D2D resource of the second cell while communicating in the first cell,
perform a cell reselection to the second cell, if the priority of the D2D communication is higher than the cellular network service, and
control the transceiver to transmit, to the second cell, a control message for requesting to use the D2D resource of the second cell for the D2D communication with a second terminal served by the second cell, the D2D resource being indicated by the second system information.

7. The first terminal of claim 6, wherein the controller is further configured to control the transceiver to receive a reconfiguration message in response to the control message, the reconfiguration message including bandwidth information associated with the D2D communication from the second cell.

8. The first terminal of claim 7, wherein the control message comprises a medium access control control element (MAC CE) including an indicator for a buffer status report for the D2D communication and information on a size of data buffered for the D2D communication.

9. The first terminal of claim 6, wherein the controller is further configured to control the transceiver to receive, from the second cell, a command message instructing the first terminal to perform a handover to a target cell, when the second cell determines to redirect the first terminal to the target cell.

10. The first terminal of claim 9, wherein the command message comprises at least one of D2D resource information of the target cell and an indicator indicating the handover to use the D2D communication.

11. A first base station for communicating, the first base station comprising:
a transceiver configured to transmit and receive a signal; and
a controller configured to:
control the transceiver to transmit system information indicating that a first cell of the first base station supports a D2D communication to a first terminal served by the first base station, the system information indicating a D2D resource of the first cell, and
control the transceiver to receive a control message for requesting to use the D2D resource of the first cell for the D2D communication with a second terminal served by the first cell,
wherein the first terminal is a terminal which performed a cell reselection from a second cell of a second base station to the first cell, when system information indicating that the second cell supports the D2D communication is not received from the second cell by the first terminal,
wherein the cell reselection was performed when the first terminal cannot perform the D2D communication by using the D2D resource of the first cell while communicating in the second cell, by determining that a priority of the D2D communication is higher than a cellular network service.

12. The first base station of claim 11, wherein the controller is further configured to control the transceiver to transmit a reconfiguration message in response to the control message, the reconfiguration message including bandwidth information associated with the D2D communication to the first terminal.

13. The first base station of claim 12, wherein the control message comprises a medium access control control element (MAC CE) including an indicator for a buffer status report for the D2D communication and information on a size of data buffered for the D2D communication.

14. The first base station of claim 11, wherein the controller is further configured to transmit, to the first terminal, a command message instructing the first terminal to perform a handover to a target cell, when the first cell determines to redirect the terminal to the target cell.

15. The first base station of claim 14, wherein the command message comprises at least one of D2D resource information of the target cell and an indicator indicating the handover to use the D2D communication.

16. A method for communicating by a first base station, the method comprising:
transmitting system information indicating that a first cell of the first base station supports a D2D communication to a first terminal served by the first base station, the system information indicating a D2D resource of the first cell; and receiving a control message for requesting to use the D2D resource of the first cell for the D2D communication with a second terminal served by the first cell, wherein the first terminal is a terminal which performed a cell reselection from a second cell of a second base station to the first cell, when system information indicating that the second cell supports the D2D communication is not received from the second cell by the first terminal, wherein the cell reselection was performed when the first terminal cannot perform the D2D communication by using the D2D resource of the first cell while communicating in the second cell, by determining that a priority of the D2D communication is higher than a cellular network service.

17. The method of claim 16, the method further comprises:

transmitting a reconfiguration message in response to the control message, the reconfiguration message including bandwidth information associated with the D2D communication to the first terminal.

18. The method of claim 17, wherein the control message comprises a medium access control control element (MAC CE) including an indicator for a buffer status report for the D2D communication and information on a size of data buffered for the D2D communication.

19. The method of claim 16, the method further comprises:

transmitting, to the first terminal, a command message instructing the first terminal to perform a handover to a target cell, when the first cell determines to redirect the terminal to the target cell.

20. The method of claim 19, wherein the command message comprises at least one of D2D resource information of the target cell and an indicator indicating the handover to use the D2D communication.

* * * * *